Dec. 19, 1967     L. A. JOHNSON     3,359,484
POWER SUPPLY APPARATUS
Filed Sept. 13, 1965
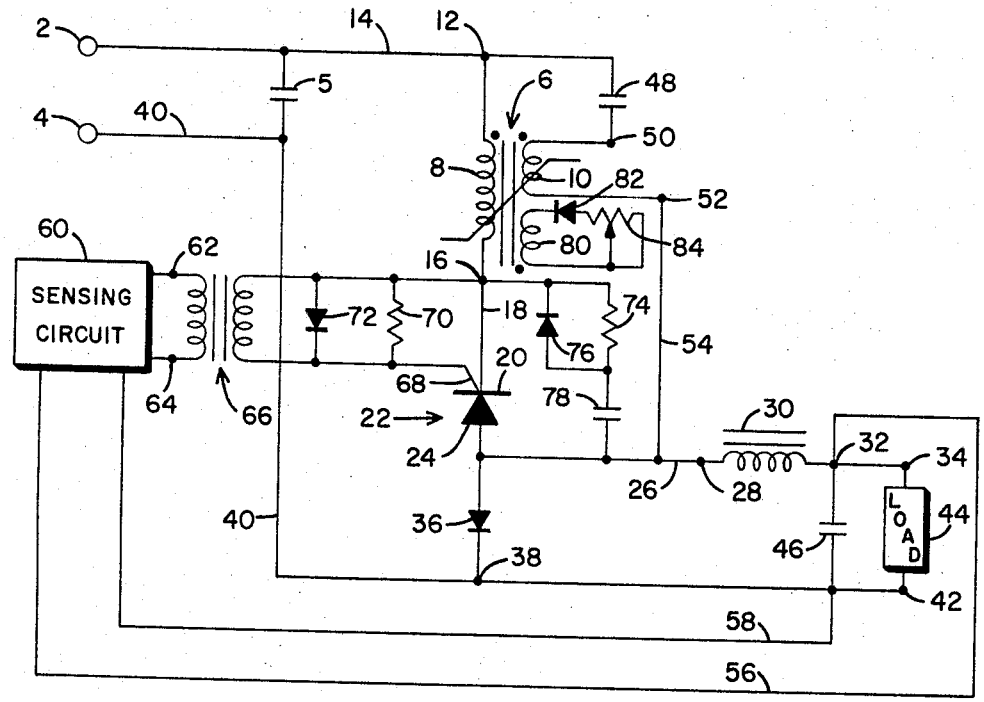
INVENTOR
LLOYD A. JOHNSON
BY Thomas J. Nikolai
ATTORNEY

United States Patent Office

3,359,484
Patented Dec. 19, 1967

3,359,484
POWER SUPPLY APPARATUS
Lloyd A. Johnson, Minneapolis, Minn., assignor to Sperry Rand Corporation, New York, N.Y., a corporation of Delaware
Filed Sept. 13, 1965, Ser. No. 487,003
9 Claims. (Cl. 323—22)

This invention relates generally to a power supply for electronic apparatus and more specifically to an improved regulator circuit for use in such a power supply.

In a publication entitled, Controlled Rectifier Manual, First Edition, published by General Electric Company at pages 122–126 there is described a regulated power supply which is based on the so called "Morgan chopper" arrangement. In this prior art arrangement a Silicon Controlled Rectifier (SCR) is connected in series with an auto-transformer having a saturable magnetic core and also in series with a filter choke and a load across an unregulated source of direct current voltage. A series resonant circuit is formed by connecting a capacitor of a prescribed value in series with a winding on the auto-transformer. Circuit means are provided for sensing variations in the voltage appearing across the load and for developing an error signal for controlling the frequency of turn on of the SCR. During the interval that the SCR is conducting, power is delivered from the unregulated source to the load. When current in the resonant circuit reverses in polarity a signal is applied to the SCR to turn it off until it is again triggered to its conducting state. During the off period, the energy stored in the filter choke provides current to the load.

The major defect of this circuit resides in the fact that if the load should accidentally be shorted, when the saturable transformer saturates, a very low impedance is presented across the direct current source and a relatively high current will flow through the SCR. In fact, this current has been found to be sufficiently high to prevent the SCR from being turned off which can cause burn out of the SCR and damage to other components employed in the power supply and in the electronic apparatus to which the power supply is connected.

Because of the novel arrangement of the components in the preferred embodiment of the present invention, the circuit always operates such that under over-current conditions the SCR is turned off prior to the time at which saturation of the saturable core transformer takes place. Hence, under short circuit conditions the current is always limited to a value sufficiently low to prevent damage to the circuitry.

Referring to the drawing in which is shown the preferred embodiment of the present invention, a pair of terminals 2 and 4 are adapted to be connected to a suitable unregulated source of direct current voltage. For example, terminal 2 may have a nominal value of −100 volts with respect to terminal 4 which may be at ground potential. A capacitor 5 is connected directly across the supply terminals 2 and 4. Also, a saturable core transformer 6 having a primary winding 8 and a secondary winding 10 is provided. A first terminal 12 of the primary winding 8 is connected to terminal 2 by way of conductor 14. The other terminal 16 of primary winding 8 is connected by a conductor 18 to the cathode electrode 20 of a Silicon Controlled Rectifier indicated generally by the numberal 22. The anode electrode 24 of SCR 22 is connected by a conductor 26 to a first terminal 28 of a filter choke 30. The other terminal 32 of choke 30 is adapted to be connected to the output terminal 34. The anode 24 of SCR 22 is also connected through a diode 36 to a junction point 38. The junction 38 is connected by way of conductor 40 to the input terminal 4 and to the output terminal 42. A load 44 is adapted to be connected between the output terminals 34 and 42. Connected between the junction 32 and the conductor 40 is a filter capacitor 46.

A capacitor 48 is connected between the junction 12 and a first terminal 50 of the secondary winding 10 of the saturable transformer 6. The other terminal 52 of secondary winding 10 is connected by a conductor 54 to a junction point on the conductor 26.

The load voltage is picked up by the conductors 56 and 58 which are respectively connected to the output terminals 34 and 42 and applied to the input terminals of a sensing circuit 60. In the preferred embodiment of the present invention, a sensing circuit may take a form similar to that shown in the afore referenced Controlled Rectifier Manual. Circuit 60 functions to produce pulses at its output terminals 62 and 64, the repetition rate of which is proportional to the degree of deviation of the output voltage at terminals 34 and 42 from a predetermined reference value. These pulses from the sensing circuit are transformer coupled, via the rtansformer 66 and applied to the gate electrode 68 of the silicon controlled rectifier 22. More specifically, the first terminal of the secondary winding of transformer 66 is connected directly to the junction 16 between the primary winding of the saturable transformer 6 and the cathode electrode 20 of the SCR 22. The other terminal of the secondary winding of transformer 66 is connected to the gate electrode 68 of SCR 22. A resistor 70 is connected in parallel with the secondary winding of transformer 66 and serves as its load. A diode 72, also connected in parallel with the secondary winding of transformer 66, serves to limit the inverse voltage applied to the gate electrode 68 to protect the SCR from damage.

A parallel combination of a resistor 74 and a diode 76 is connected in series with a capacitor 78 between the cathode electrode 20 and the anode electrode 24 of the SCR 22. The diode 76 reduces the rate that the reapplied source voltage is applied across the SCR permitting the SCR to turn off at a faster rate. The resistor 74 and capacitor 78 serve to reduce transient voltage spikes across the SCR so that a lower rated voltage SCR can be employed. In order to control the saturation characteristics of the transformer 6, it may be convenient to include an additional bias winding 80 to the core which is connected in series with a rectifier diode 82 and a variable resistor 84 which is utilized to control the current flowing through the bias winding 80.

Now that the details of the circuit components and interconnections have been described in detail, consideration will next be given to the operation of the improved voltage regulator circuit of the present invention.

*Operation*

The function of the circuit of this invention is to provide a means for maintaining the voltage appearing across the output terminals 34 and 42 relatively constant in spite of variations in the impedance of the load 44 or in the value of the unregulated direct current voltage applied across the input terminals 2 and 4. To accomplish this function, a SCR 22 is connected across the input terminals 2 and 4 in series with the primary winding 8 of a saturable transformer 6, a filter choke 30, and a load 44. The SCR 22 operates as a switch in series with the load for applying pulses having a duration determined by the parameters of a resonant circuit. More specifically, the capacitor 48 and the effective inductance of the saturable transformer 6 form a resonant circuit whose oscillations control the turn off of the SCR. Once triggered to the on state, the SCR remains conducting until the resonant circuit output reverses in polarity to thereby apply an inverse voltage across the SCR. The repetition rate of the pulses supplied to the load 44 is controlled by the sensing circuit 60. The input of the sensing circuit which is applied thereto by way of conductors 56 and 58, senses the output voltage appearing across the load 44 and produces output pulses at the terminals 62 and 64 at a repetition rate directly proportional to the degree of deviation of the load voltage from a predetermined value. For example, if the voltage appearing across the load 44 is low, the repetition rate of the pulses appearing at terminals 62 and 64 increases until the load voltage reaches a value determined by a setting of a control in the sensing circuit 60. On the other hand, if the load voltage tends to rise above the preset level the sensing circuit detects this condition and produces pulses having a lower repetition rate. During the "off-time" of the SCR 22, constant current to the load is maintained by the energy stored in the choke 30 and the capacitor 46. This current path is from terminal 28 through conductor 26, diode 36, and the load 44 to terminal 32.

If the operation of the circuit is considered during normal operating conditions, i.e., in the absence of an over current through the load 44, and just prior to the "turn-on" of the SCR 22, the load current is maintained by the filter choke 30 and the capacitor 46 through the diode 36 which is conducting from the previous cycle. The diode 36 current is essentially equal to the current flowing through the load 44. Now, when the SCR 22 is turned on by a gate pulse from the secondary of the transformer 66, two simultaneous modes of operation are initiated. In the first mode, the primary winding 8 of the saturable transformer 6 presents a large unsaturated inductance which temporarily supports the source voltage. The SCR current flowing from the input terminal 4 through the diode 36, the SCR 22 and the primary winding 8 of the transformer 6 to the input terminal 2 opposes the load current flowing through the diode 36 which tends to render the diode 36 nonconducting. During the turn-off process of diode 36, a relatively large reverse current flows through the diode 36 and drives the saturable transformer 6 into a saturated condition. The voltage at terminal 52 approaches two times the input direct current voltage due to the resonance produced by the capacitor 48 and the inductance of transformer 6. This voltage less the voltage appearing across the output terminals 34 and 42 is impressed across the filter choke 30, thereby driving it toward saturation. After a time period determined by the effective saturated inductance of transformer 6 and the capacitance of condenser 48, the resonant circuit current reverses in direction and flows through the SCR in the reverse direction, i.e. from cathode 20 to the anode 24. At the time that this reverse current exceeds the normal forward current in the SCR, it turns it off thereby completing the cycle.

The second simultaneous mode of operation occurs before the transformer 6 saturates. When the SCR 22 turns on, transformer action takes place to charge capacitor 48 resonantly with the unsaturated inductance of the transformer secondary winding 10. At rated load current, when this resonant current reverses through the secondary winding of transformer 6, reverse transformer action causes the potential on the SCR 22 to reverse to render it non-conducting.

In the prior art circuit referred to above, an essential requirement for the SCR to turn off is that the saturable auto-transformer must be saturated. It has been found that under an over current or short circuit load condition the prior art voltage regulator circuit may be damaged in that the SCR contained therein will not always be turned off when the transformer saturates. With the load shorted and the SCR conducting, when the auto-transformer becomes saturated only a very low impedance is present across the voltage source and hence an excessively large current flows which can destroy the SCR.

To explain this short-circuit protection in detail, an over-current or short-circuit condition results in an increase in the forward current flowing through the diode 36, since this forward current is no longer limited by the load impedance 44. This additional current increases the reverse recovery time of the diode 36 which, in turn, increases the time required to saturate the transformer 6. This delay allows the resonant circuit consisting of the capacitor 48 and the secondary winding 10 of the transformer 6 to complete its cycle, thus turning the SCR 22 off before saturation can occur.

At the completion of a normal cycle where the SCR is turned off due to the saturation of the transformer 6 and not because of the reverse transformer action produced by the reversal of current in the resonant circuit, the residual magnetization ($B_r$) in the core is at an initial point somewhere between negative and positive saturation. Upon each unsaturated cycle initiated by triggering of the SCR and terminated by the reverse transformer action of the resonant circuit, the residual magnetization creeps closer towards saturation until eventual saturation occurs thereby returning the residual magnetization to the initial point. During the unsaturated cycles between saturated cycles only a small current impulse is applied to the load. By observing the waveform of the current flowing in the filter choke 30 it was found that when the load current was just slightly above the rated value, alternate saturated and unsaturated cycles occurred. However, under heavy load current conditions produced by a shorted load impedance, it was found that there were as many as twenty unsaturated cycles for each saturated cycle. It is only during a saturated cycle that a substantial load current is produced. Because under short circuit conditions these saturated cycles occur infrequently, the average load current is maintained at a safe value.

It is to be especially noted that the present invention provides short-circuit protection to the aforementioned prior art circuit configuration with no additional circuit components being required and therefore at no additional cost.

For the purpose of illustration only since component values are not absolutely critical, the following component values and voltage values may be employed in constructing preferred embodiment of the invention.

| | | |
|---|---|---|
| $E_{2-4}$ | volts | 100 |
| $E_{34-32}$ | do | 12 |
| $SCR_{20}$ | | Type GE C40C |
| $L_{30}$ | millihenrys | 5 |
| $Diode_{36}$ | | Type 1N402 |
| $C_{46}$ | microfarads | 49000 |
| $C_{48}$ | do | 40 |
| $R_{70}$ | ohms | 47 |
| $Diode_{72}$ | | Type 1N2069 |
| $R_{74}$ | ohms | 10 |
| $Diode_{76}$ | | Type 1N1489 |
| $C_{78}$ | microfarad | 0.5 |
| $Diode_{82}$ | | Type 1N1489 |
| $R_{84}$ | ohms (variable) | 3 |

What is claimed is:

1. A voltage regulator for a direct power supply comprising:
   (a) a source of unregulated direct current voltage;
   (b) a saturable core transformer having at least a primary winding and a secondary winding;
   (c) an electronic switching device having a control electrode adapted to receive control signals for changing the impedance of said switching device in response thereto;
   (d) means connecting said primary winding and said electronic switching device in series circuit with a load and across said source of direct current voltage;
   (e) a series resonant circuit including a capacitor connected to said secondary winding connected in parallel with said primary winding and said switching device;

(f) sensing means responsive to the voltage appearing across said load for producing control signals having a frequency proportional to the deviation of the load voltage from a predetermined value; and (g) means connecting the output of said sensing means to said control electrode, the arrangement being such that said switching device is turned on periodically by said control signal and turned off prior to saturation of said saturable core transformer under abnormal load conditions.

2. Apparatus as in claim 1 wherein said eelctronic switching device is a silicon controlled rectifier.

3. Apparatus as in claim 1 wherein said saturable core transformer further contains a bias winding for controlling the saturation characteristics of said transformer.

4. A voltage regulating circuit for a direct current power supply, comprising:

(a) a source of unregulated direct current voltage;
(b) a load, the voltage across which is to be regulated to be within a predetermined range from a preset value;
(c) means including the primary winding of saturable core transformer, said transformer having at least a primary winding and a secondary winding, a silicon controlled rectifier and a filter choke connected in series with said load and across said source of unregulated voltage;
(d) means including a capacitor and the secondary winding of said unsaturable core transformer connected in parallel with the series combination of said primary winding and said silicon controlled rectifier;
(e) means for sensing the voltage across said load for developing pulses having a repetition rate proportional to the deviation of said load voltage from said preset value; and
(f) means for applying said pulses to the control electrode of said silicon controlled rectifier for periodically initiation conduction therethrough.

5. Apparatus as in claim 4 wherein said primary winding is only inductively coupled to said secondary winding.

6. Apparatus as in claim 4 wherein said saturable core transformer further includes a bias winding coupled to the core in the series with rectifying means and current controlling means for adjusting the saturation characteristics of said core.

7. Apparatus as in claim 4 wherein said capacitor is of a value to resonate with the effective saturated inductance of said transformer.

8. Apparatus as in claim 4 and further including a capacitor connected in parallel with said load.

9. Apparatus as in claim 4 and further including a unidirectional current conducting device connected in parallel with the series combination of said filter choke and said load and poled to conduct current from said choke to said load when said silicon controlled rectifier is non-conducting.

References Cited

UNITED STATES PATENTS

| | | | |
|---|---|---|---|
| 3,019,355 | 1/1962 | Morgan | 307—88.5 |
| 3,138,722 | 6/1964 | Morgan | 307—88.5 |
| 3,197,691 | 7/1965 | Gilbert | 321—18 |
| 3,204,172 | 8/1965 | Darling et al. | 321—18 XR |
| 3,209,237 | 9/1965 | Wiest | 323—22 |
| 3,305,699 | 2/1967 | Watrous et al. | 307—88.5 |
| 3,320,519 | 5/1967 | Morgan | 321—18 XR |

JOHN F. COUCH, *Primary Examiner.*

W. M. SHOOP, JR., *Assistant Examiner.*

UNITED STATES PATENT OFFICE

CERTIFICATE OF CORRECTION

Patent No. 3,359,484                      December 19, 1967

Lloyd A. Johnson

It is hereby certified that error appears in the above numbered patent requiring correction and that the said Letters Patent should read as corrected below.

Column 1, line 65, for "numberal" read -- numeral --; column 2, line 21, for "rtansformer" read -- transformer --; line 57, for "terminais" read -- terminals --; column 4, line 61, after "direct" insert -- current --; column 5, line 13, for "eelctronic" read -- electronic --; same column 5, line 31, for "unsaturable" read -- saturable --.

Signed and sealed this 28th day of January 1969.

(SEAL)
Attest:

Edward M. Fletcher, Jr.
Attesting Officer

EDWARD J. BRENNER
Commissioner of Patents